(12) United States Patent
Jones et al.

(10) Patent No.: US 12,229,731 B2
(45) Date of Patent: Feb. 18, 2025

(54) APPLIANCE MONITORING SYSTEMS

(71) Applicant: WHIRLPOOL CORPORATION, Benton Harbor, MI (US)

(72) Inventors: Martin Kelly Jones, Vancouver (CA); Scott Andrew Horstemeyer, Atlanta, GA (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 18/212,964

(22) Filed: Jun. 22, 2023

(65) Prior Publication Data

US 2023/0334437 A1 Oct. 19, 2023

Related U.S. Application Data

(63) Continuation of application No. 17/891,223, filed on Aug. 19, 2022, now Pat. No. 11,720,864, which is a continuation of application No. 17/007,842, filed on Aug. 31, 2020, now Pat. No. 11,436,569, which is a continuation of application No. 16/505,795, filed on Jul. 9, 2019, now Pat. No. 10,817,848, which is a continuation of application No. 16/001,530, filed on Jun. 6, 2018, now Pat. No. 10,366,372, which is a continuation of application No. 14/627,248, filed on
(Continued)

(51) Int. Cl.
| | | |
|---|---|---|
| G08B 1/08 | (2006.01) | |
| G06Q 10/20 | (2023.01) | |
| G06Q 30/0601 | (2023.01) | |
| H04L 12/28 | (2006.01) | |
| H04L 67/02 | (2022.01) | |
| H04L 67/125 | (2022.01) | |

(52) U.S. Cl.
CPC ......... *G06Q 10/20* (2013.01); *G06Q 30/0631* (2013.01); *H04L 12/2825* (2013.01); *H04L 67/02* (2013.01); *H04L 67/125* (2013.01)

(58) Field of Classification Search
CPC ................ G06Q 10/20; G06Q 30/0631; H04L 12/2825; H04L 67/02; H04L 67/125; H04L 12/40189; H04L 12/403; H04L 67/12; H04L 67/306
See application file for complete search history.

(56) References Cited

U.S. PATENT DOCUMENTS 5,216,541 A 6/1993 Takesue et al.
5,546,379 A 8/1996 Thaweethai et al.
(Continued)

FOREIGN PATENT DOCUMENTS

JP 2002295939 A2 10/2002
WO 2005/108942 A1 11/2005

OTHER PUBLICATIONS

Search Report Issued in Connection With EP Application No. 11174206.0, Mailed Sep. 28, 2011.

*Primary Examiner* — Toan N Pham
(74) *Attorney, Agent, or Firm* — McGarry Bair PC

(57) ABSTRACT

A host computer and method implemented in a host computer system associated with a site having one or more appliances that communicates with the host computer system via one or more networks. The host computer having code operable to turn off or disable an appliance or an electrical function associated with a maintenance issue by operation of the host computer.

19 Claims, 8 Drawing Sheets

Related U.S. Application Data

Feb. 20, 2015, now Pat. No. 10,013,677, which is a continuation-in-part of application No. 13/761,636, filed on Feb. 7, 2013, now Pat. No. 8,981,930.

(60) Provisional application No. 61/595,931, filed on Feb. 7, 2012.

(56) References Cited

U.S. PATENT DOCUMENTS

| | | | |
|---|---|---|---|
| 5,909,183 A | 6/1999 | Bartstahl et al. | |
| 5,987,105 A | 11/1999 | Jenkins et al. | |
| 6,496,575 B1 | 12/2002 | Vasell et al. | |
| 6,772,096 B2 | 8/2004 | Murakami et al. | |
| 6,853,291 B1 | 2/2005 | Aisa | |
| 6,870,480 B2 * | 3/2005 | Suzuki | G05B 23/0283 |
| | | | 379/106.01 |
| 6,906,617 B1 | 6/2005 | Van Der Meulen | |
| 6,947,736 B2 | 9/2005 | Shaver et al. | |
| 6,990,335 B1 | 1/2006 | Shamoon et al. | |
| 7,127,734 B1 | 10/2006 | Amit | |
| 7,336,192 B2 | 2/2008 | Aisa | |
| 7,372,004 B2 | 5/2008 | Buchner et al. | |
| 7,872,574 B2 | 1/2011 | Betts et al. | |
| 8,271,336 B2 | 9/2012 | Mikurak | |
| 8,599,008 B2 | 3/2013 | Watson et al. | |
| 8,432,291 B2 | 4/2013 | Han et al. | |
| 8,760,307 B2 * | 6/2014 | Falcioni | A47L 15/46 |
| | | | 702/182 |
| 8,826,165 B2 | 9/2014 | Harrod et al. | |
| 8,981,930 B2 | 3/2015 | Horstemeyer et al. | |
| 9,015,059 B2 * | 4/2015 | Sims, III | G06Q 10/087 |
| | | | 705/7.11 |
| 9,058,707 B2 | 6/2015 | Benson | |
| 9,332,140 B2 | 5/2016 | Melo | |
| 10,366,372 B2 | 7/2019 | Jones et al. | |
| 2001/0025349 A1 | 9/2001 | Sharood et al. | |
| 2002/0021465 A1 | 2/2002 | Moore, Jr. et al. | |
| 2002/0095269 A1 * | 7/2002 | Natalini | H04L 43/0817 |
| | | | 702/188 |
| 2002/0130652 A1 | 9/2002 | Bessler | |
| 2002/0165784 A1 | 11/2002 | Taggart et al. | |
| 2003/0149757 A1 | 8/2003 | Ueno et al. | |
| 2003/0167785 A1 | 9/2003 | Roh et al. | |
| 2008/0047287 A1 | 2/2008 | Ruppert | |
| 2008/0164980 A1 | 7/2008 | Ha et al. | |
| 2008/0231468 A1 | 9/2008 | Myllymaki | |
| 2009/0009287 A1 | 1/2009 | Falcioni et al. | |
| 2009/0100132 A1 | 4/2009 | Ebrom et al. | |
| 2009/0228488 A1 | 9/2009 | Brand et al. | |
| 2011/0074589 A1 | 3/2011 | Han et al. | |
| 2011/0202910 A1 | 8/2011 | Venkatakrishnan et al. | |
| 2011/0309924 A1 | 12/2011 | Dybalski et al. | |
| 2012/0019378 A1 | 1/2012 | Watson et al. | |
| 2012/0098977 A1 | 4/2012 | Striemer et al. | |
| 2014/0101058 A1 | 4/2014 | Castel et al. | |
| 2014/0278248 A1 * | 9/2014 | Whittle | G05B 23/0283 |
| | | | 702/183 |
| 2017/0161752 A1 * | 6/2017 | Siravuri | G06Q 30/016 |

* cited by examiner

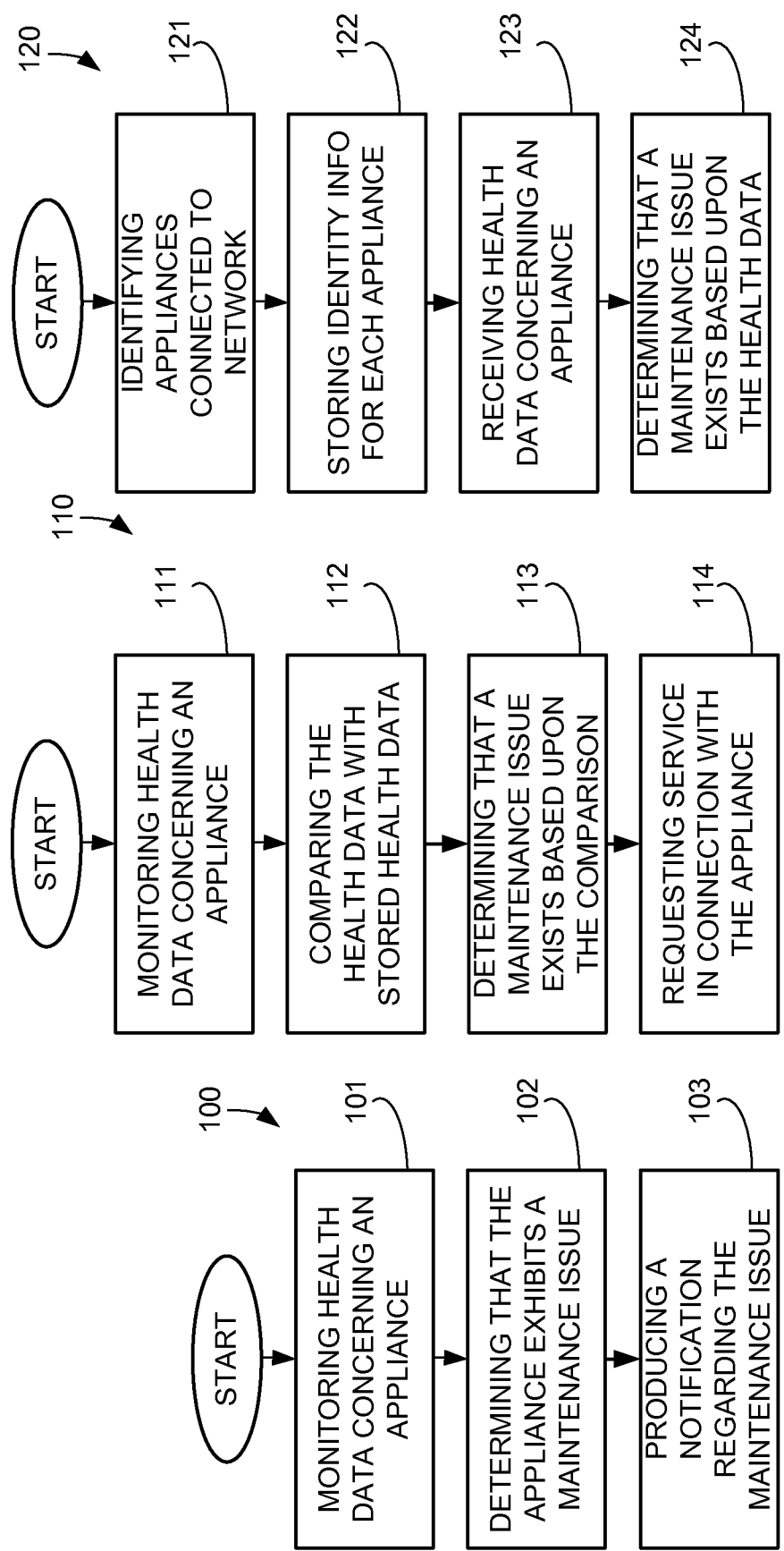

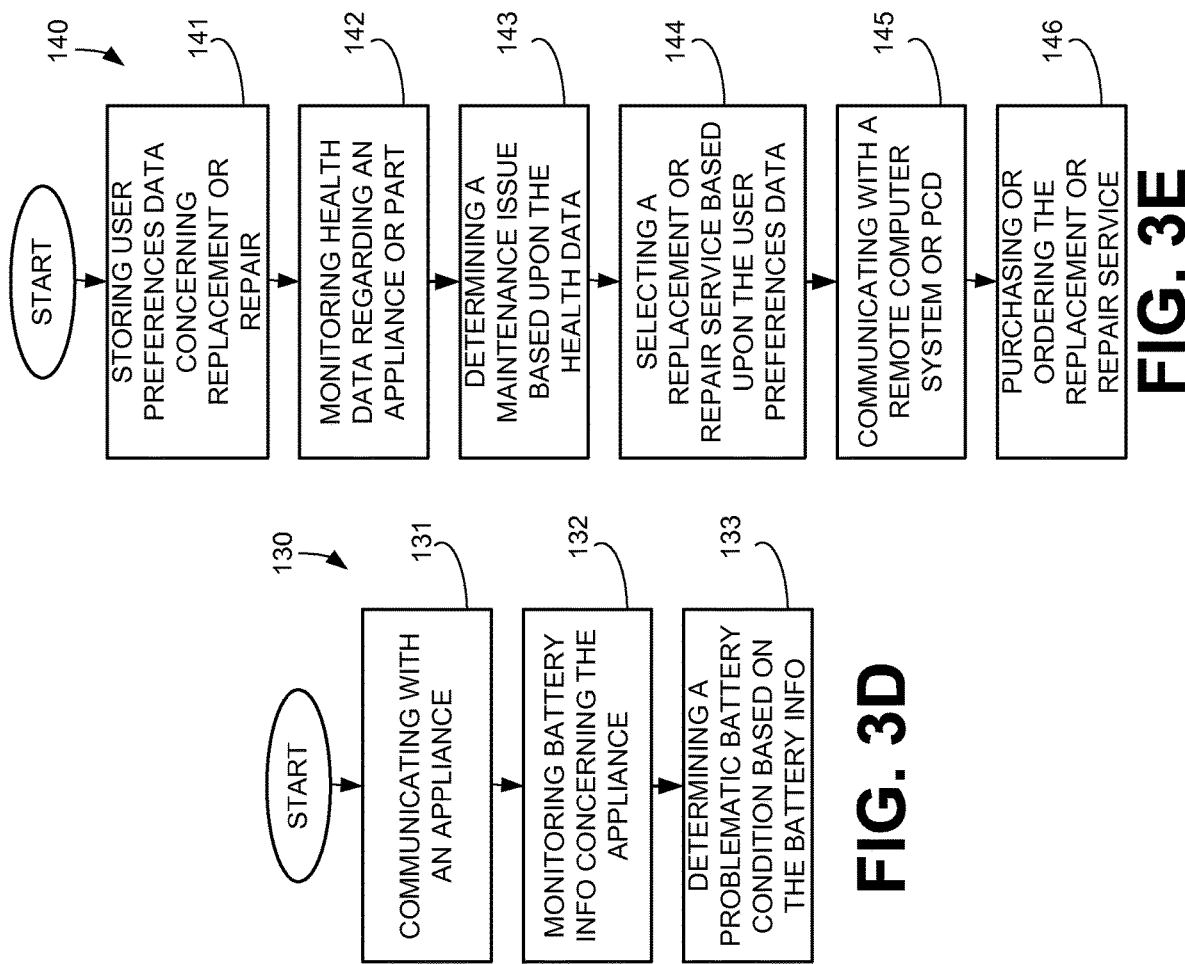

APPLIANCE MONITORING SYSTEMS

CROSS-REFERENCE TO RELATED APPLICATION(S)

This application is a continuation of U.S. patent application Ser. No. 17/891,223, filed on Aug. 19, 2022, now U.S. Pat. No. 11,720,864, issued Aug. 8, 2023, which is a continuation application of U.S. patent application Ser. No. 17/007,842, filed on Aug. 31, 2020, now U.S. Pat. No. 11,436,569, issued Sep. 6, 2022, which is a continuation of U.S. patent application Ser. No. 16/505,795 filed Jul. 9, 2019, now U.S. Pat. No. 10,817,848, issued Oct. 27, 2020, which is a continuation of U.S. patent application Ser. No. 16/001,530, filed Jun. 6, 2018, now U.S. Pat. No. 10,366,372, issued Jul. 30, 2019, which is a continuation of U.S. patent application Ser. No. 14/627,248, filed Feb. 20, 2015, now U.S. Pat. No. 10,013,677, issued Jul. 3, 2018, which is a continuation-in-part (CIP) of U.S. patent application Ser. No. 13/761,636, filed Feb. 7, 2013, now U.S. Pat. No. 8,981,930, issued Mar. 17, 2015, which claims priority to and the benefit of U.S. Provisional Application No. 61/595,931, filed Feb. 7, 2012, all of the foregoing of which are entirely incorporated herein by reference.

BACKGROUND

A home network connects various digital home appliances so that the user can always enjoy convenient, safe, and economic life services inside or outside the house. Refrigerators or washing machines called "white home" appliances have been gradually digitalized due to the development of digital signal processing techniques, home appliance operating system techniques, and high speed multimedia communication techniques integrated on the digital home appliances. Furthermore, new information home appliances have been developed, to improve the home network.

Home networks can take many forms and can be classified as follows, by types of services they provide: a data network, an entertainment network, and a living network. The data network connects computers and peripherals, and typically provides Internet service. The entertainment network connects A/V (audio/video) devices, such as televisions, audio equipment, etc. The living network connects and controls home appliances, such as an electric oven, dishwasher, refrigerator, laundry washer, freezer, lights, etc. In the past, systems have been invented for recording diagnostic and statistical information associated with household appliances. This information is recorded and can be used by a service person to monitor functionality and the wear status of such appliances. An example of such a system is described in U.S. Pat. No. 6,853,291, which is incorporated herein by reference. Another example of such a system is described in U.S. Pat. No. 7,336,192, which is also incorporated herein by reference.

A conventional home network system includes a master device which is an electric device for controlling an operation of the other electric devices or monitoring a status thereof, and a slave device which is an electric device having a function of responding to the request of the master device and a function of notifying a status change according to characteristics of the electric devices or other factors. Exemplary electric devices include home appliances for the living network service, such as a washing machine and a refrigerator, home appliances for the data network service and the entertainment network service, and products such as a gas valve control device, an automatic door device and an electric lamp.

However, the conventional arts do not suggest a general communication standard for providing functions of controlling and monitoring electric devices in a home network system. Also, a network protocol in the conventional art home network system does not suggest an effective method for receiving and transmitting a packet. However, U.S. patent application no. 2008/0164980, which is incorporated herein by reference, describes a control protocol that can be used to communicate among the various electric appliances associated with the data network, the entertainment network, and the living network.

Although significant strides have been made to fully automatic the home network, the foregoing prior art systems are not user friendly, and the art remains in a state of infancy. Better, more intelligent, monitoring systems and systems for taking automatic action, perhaps based on user preferences, are needed.

BRIEF DESCRIPTION

An aspect of the present disclosure relates to a method implemented in a host computer system associated with a site having one or more appliances that communicate with the host computer system via one or more networks. The method including monitoring health data concerning an appliance or an appliance part, determining that the appliance or appliance part exhibits a maintenance issue based upon the health data, determining that the maintenance issue is associated with an electrical function, turning off or disabling the appliance or the electrical function associated with the maintenance issue by operation of the host computer.

Another aspect of the present disclosure relates to a computer system computer system communicatively coupled with one or more appliances at a site via one or more networks. The computer system comprising one or more memories that store computer program code, and one or more processors that execute the computer program code, the computer program code having code that determines that an appliance or appliance part exhibits a maintenance issue comprising and code that causes an appliance to be turned off or that disables one or more functions associated with the appliance, after determining that the maintenance issue exists.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 3A is a flow chart of a first set of embodiments of the appliance monitoring system of FIG. 2.

FIG. 3B is a flow chart of a second set of embodiments of the appliance monitoring system of FIG. 2.

FIG. 3C is a flow chart of a third set of embodiments of the appliance monitoring system of FIG. 2.

FIG. 3D is a flow chart of a fourth set of embodiments of the appliance monitoring system of FIG. 2.

FIG. 3E is a flow chart of a fifth set of embodiments of the appliance monitoring system of FIG. 2.

DETAILED DESCRIPTION

The present invention provides systems, methods, and apparatus for monitoring appliances at a site, such as a household, business office, etc. The appliances can include, for example but not limited to, an electric oven, dishwasher, refrigerator, laundry washer, freezer, pool controller, light bulb, microwave oven, computer, motor vehicle, television, telephone, etc. The appliance can be anything that can be electronically monitored at the site in connection with the various embodiments that will be described hereafter. In many of the embodiments, the appliance has a computer based architecture or a controller that enables communication of data concerning the electronic appliance. In some embodiments the appliance is an apparatus with a radio frequency identification (RFID) tag or other passive device that can be interrogated for information concerning the appliance. The appliance can even be a nonelectrical apparatus that has an RFID tag or other passive device.

A. Host Computer System

Figure 1:
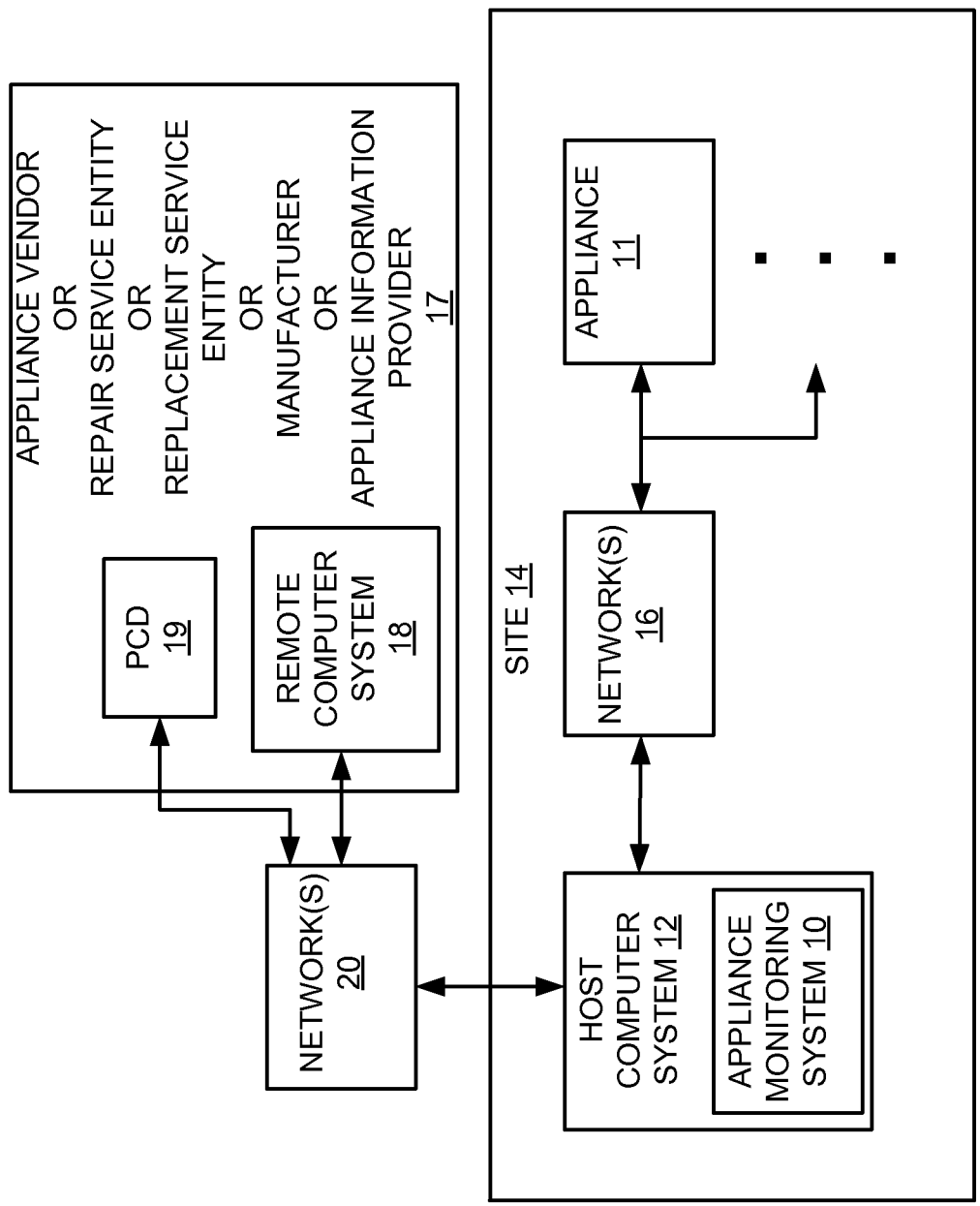
FIG. 1 is a block diagram showing an example of an appliance monitoring system in accordance with the present invention.

FIG. 1 is a block diagram showing an example of an appliance monitoring system 10 in a host computer system 12 for monitoring one or more appliances 11 situated at or near a site 14, such as a household, business office, etc. The appliance monitoring system 10 can be implemented in hardware, software, or a combination thereof. In the preferred embodiments, the appliance monitoring system 10 is implemented as software that is executed by a host computer system 12 situated at or near the site 14. Furthermore, in some embodiments, the host computer system 12 can implemented as part of a wireless access point (WAP) or router.

The appliance 11 is communicatively coupled to the host computer system 12 via one or more networks 16, which are wired, wireless, or a combination, depending upon the implementation. Nonlimiting examples are IEEE 802.11 (WiFi), Ethernet, infrared (IR), short distance wireless radio, CEBus, Lonworks, and X10 (over power lines).

U.S. Pat. No. 7,127,734, which is incorporated herein by reference, describes a system for home network communications over existing cable TV wires that can be employed in embodiments of the present disclosure, if desired, as the network(s) 16.

U.S. patent application no. 2008/0164980, which is incorporated herein by reference, describes a control protocol that can be used to communicate among the various electric appliances associated with a data network(s), an entertainment network(s), and a living network(s), all of the foregoing of which would constitute the network(s) 16.

U.S. Pat. No. 6,947,736, which is incorporated herein by reference, describes a home network that can be employed by various embodiments of the present disclosure as the network(s) 16. This home network is based on the IEEE 802.11 networking standard expanded to encompass home phone line media communications and/or home power line media communications.

The host computer system 12 is equipped with a suitable transceiver(s) (TX/RX) for enabling communication via the network(s) 16. The specific design of the TX/RX(s) depends upon the network design.

The overall system may be designed so that the one or more appliances 11 push data to the host computer system 12, intermittently or on a periodic basis. The overall system may be designed so that the host computer system 12 solicits, or pulls, the data from the appliances 12.

Optionally, the host computer system 12 may be designed to enable the host computer system 12 to communicate with one or more remote computer systems 18 and/or personal communications devices (PCDs) 19 via one or more networks 20. The PCDs 19 may be a smartphone, etc. During these communication sessions, the host computer system 12 may, for example, request health data pertaining to an appliance 11, advise a service provider of a maintenance issue, etc.

Figure 2:
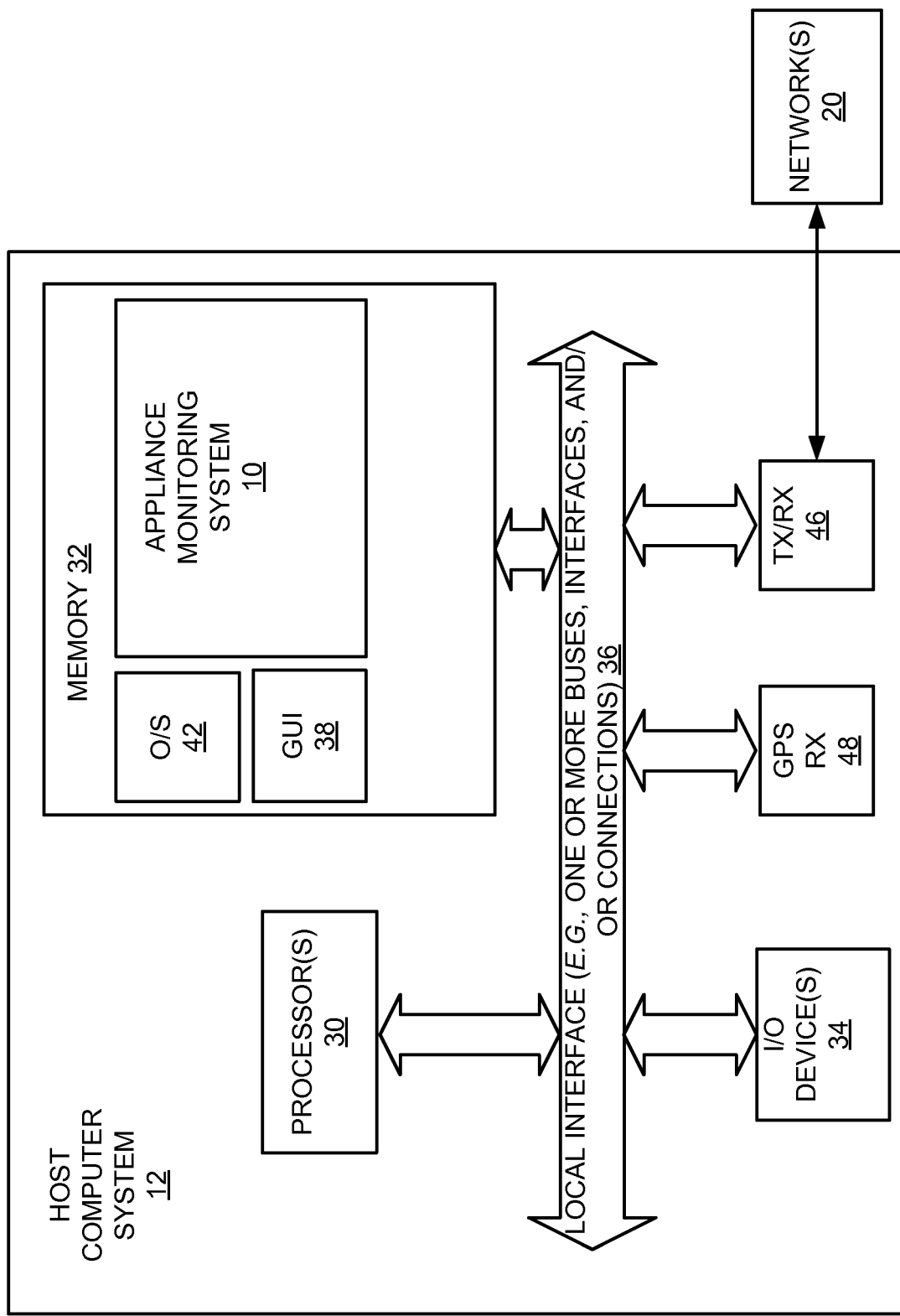
FIG. 2 is a block diagram showing an example of the host computer system of FIG. 1 in which the appliance monitoring system is implemented.

An example of the architecture of the host computer system 12 is shown in FIG. 2 and will be described immediately hereafter. Generally, in terms of hardware architecture, as shown in FIG. 2, the host computer system 12 includes a processor 30, a memory 32, and optional input and/or output (I/O) devices 34 (or peripherals) that are communicatively coupled via a local interface 36. The local interface 36 can be, for example but not limited to, one or more buses or other wired or wireless connections, as is known in the art. The local interface 36 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 30 is a hardware device for executing software, particularly that stored in memory 32. The processor 30 can be any custom made or commercially available processor, a central processing unit (CPU), an auxiliary processor among several processors associated with the host computer system 12, a semiconductor based microprocessor (in the form of a microchip or chip set), a macroprocessor, or generally any device for executing software instructions.

The memory 32 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 102 may incorporate electronic, magnetic, optical, and/or other types of storage media. Note that the memory 32 can have a distributed architecture, where various components are situated remote from one another, but can be accessed by the processor 30.

The software in memory 32 may include one or more separate programs, each of which comprises an ordered listing of executable instructions for implementing logical functions. In the example of FIG. 2, the software in the memory 32 includes, among other things, a graphical user interface (GUI; an optional feature) 38 for generating and driving display screens and exchanging other information with a display 34, the appliance monitoring system 10, algorithms 40 (an optional feature) situated in the appliance monitoring system 10 for use in connection with triggering events, and a suitable operating system (O/S) 42. The O/S 42 essentially controls the execution of other computer programs, such as the appliance monitoring system 10, and provides scheduling, input-output control, file and data management, memory management, and communication control and related services.

The I/O devices 34 may include input devices, for example but not limited to, a keypad, keyboard, finger pad, mouse, scanner, microphone, transducers (sensors), etc. Furthermore, the I/O devices 34 may also include output devices, for example but not limited to, a printer, display, speaker, etc. Finally, the I/O devices 34 may further include devices that communicate both inputs and outputs, for instance but not limited to, a modulator/demodulator (modem; for accessing another device, system, or network), a radio frequency (RF) or other transceiver (TX/RX), a telephonic interface, a bridge, a router, etc.

A TX/RX 46 is provided in the host computer system 12 to enable the system 12 to communicate to the one or more remote computer systems 18 (FIG. 1). The specific design of the TX/RX 46 to be utilized depends upon the type of network(s) 20 that is utilized. The network(s) 20 can include one or more of any suitable networks, for example but not limited to, a wireless, wired, analog, digital, packetized, nonpacketized, cellular, Internet, WiFi, etc.

U.S. patent application no. 2002/0021465, which is incorporated herein by reference, describes a home network gateway that can be used in connection with many embodiments of the present disclosure as an interface between the networks 16, 20, where the network 20 is a hybrid fiber coaxial (HFC) network.

The host computer system 12 may also be equipped with other TX/RXs and related software to enable the host computer system 12 to communicate with appliances 11 and/or a PCD associated with the site owner or user. In some embodiments, the site owner or user can be advised of appliance use information and/or maintenance issues associated with an appliance or appliance part.

When the host computer system 12 is in operation, the processor 30 is configured to execute software stored within the memory 32, to communicate data to and from the memory 32, and to generally control operations of the host computer system 12 pursuant to the software. The appliance monitoring system 10 and the O/S 42, in whole or in part, but typically the latter, are read by the processor 30, perhaps buffered within the processor 30, and then executed.

The appliance monitoring system 10 (as well as any other software of the present disclosure) can be stored on any non-transitory computer readable medium for use by or in connection with any computer related system or method. In the context of this document, a computer readable medium is an electronic, magnetic, optical, or other physical device or means that can contain or store a computer program for use by or in connection with a computer related system or method. The appliance monitoring system 10 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be anything that can store the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

Optionally, the host computer system 12 may be equipped with a global positioning system (GPS) receiver 48 for producing and updating GPS data 204 (FIG. 4) that is stored in memory 32. Optionally, the host computer system 12 may also be provided with map data 205 (FIG. 4), which can be stored in memory 32 and/or downloaded and updated via a remote computer system 18. The GPS data 204 can be used to determine the location of the host computer system 12, and generally, the location of the site 14, and the location can be correlated with the map data 205. Thus, the location data and/or map data 205 can be used by the appliance monitoring system 10 to, among other things, assist with diagnosing and repairing an appliance. As an example, if it is known that the site 14 is an outdoor hut at a ski resort, then an algorithm(s) 201 (FIG. 4) associated with the appliance monitoring system 10 may reduce the lifespan of the appliance because of the extra wear that the appliance would bear due to the harsh weather conditions.

Optionally, a user preferences database 203 (FIG. 4) for storing preferences that are input, selected, or otherwise preset by a party may be associated with the appliance monitoring system 10 of the host computer system 12. This database 203 will be described in more detail later in this disclosure. The user can store the user preferences, for example, by interacting with the host computer system 12 via the GUI 38.

B. Appliance Monitoring System

1. First Set of Embodiments

A first set of embodiments of the appliance monitoring system 10 (FIGS. 1 and 2) will now be described with reference to FIG. 3A. In this first set, denoted by reference numeral 100, the appliance monitoring system 10 includes at least the following program code (or logic): program code 101 for monitoring health data concerning an appliance 11, program code 102 for determining that the appliance 11 exhibits a maintenance issue based upon the health data, and program code 103 for producing a notification regarding the maintenance issue. As nonlimiting examples, the maintenance issue can be any one or more of the following: a need for replacement of the appliance 11 or a component thereof, a need for repair of the appliance 11 or a component thereof, a need for battery recharging, lifespan expired, lifespan below a predefined threshold, power inadequacy, appliance inoperability for intended purpose, inoperability of one or more functions (electrical and/or mechanical), network connectivity failure, the appliance 11 or a part thereof poses a hazard, etc. The health data can be any type of data for enabling assessment of the health, or proper functioning, of the appliance 11, for example but not limited to, statistical information, an indication that one or more parts are non-functioning, diagnostic information, electrical information (e.g., power, voltage, current, and/or impedance of or at appliance circuit elements, etc.), length of service of the appliance 11 or parts thereof, age of the appliance 11 or parts thereof, an event that is detected by the event detection engine 215 (FIG. 6), etc. Furthermore, the notification can be anything that advises a person, device, or computer system of the maintenance issue, including but not limited to, a display of text on a local display screen, a message in an email sent to a local or remote computer, a text message, a local flashing light, a communication to a remote computer system 18 or PCD 19, a sound, etc.

Figure 4:
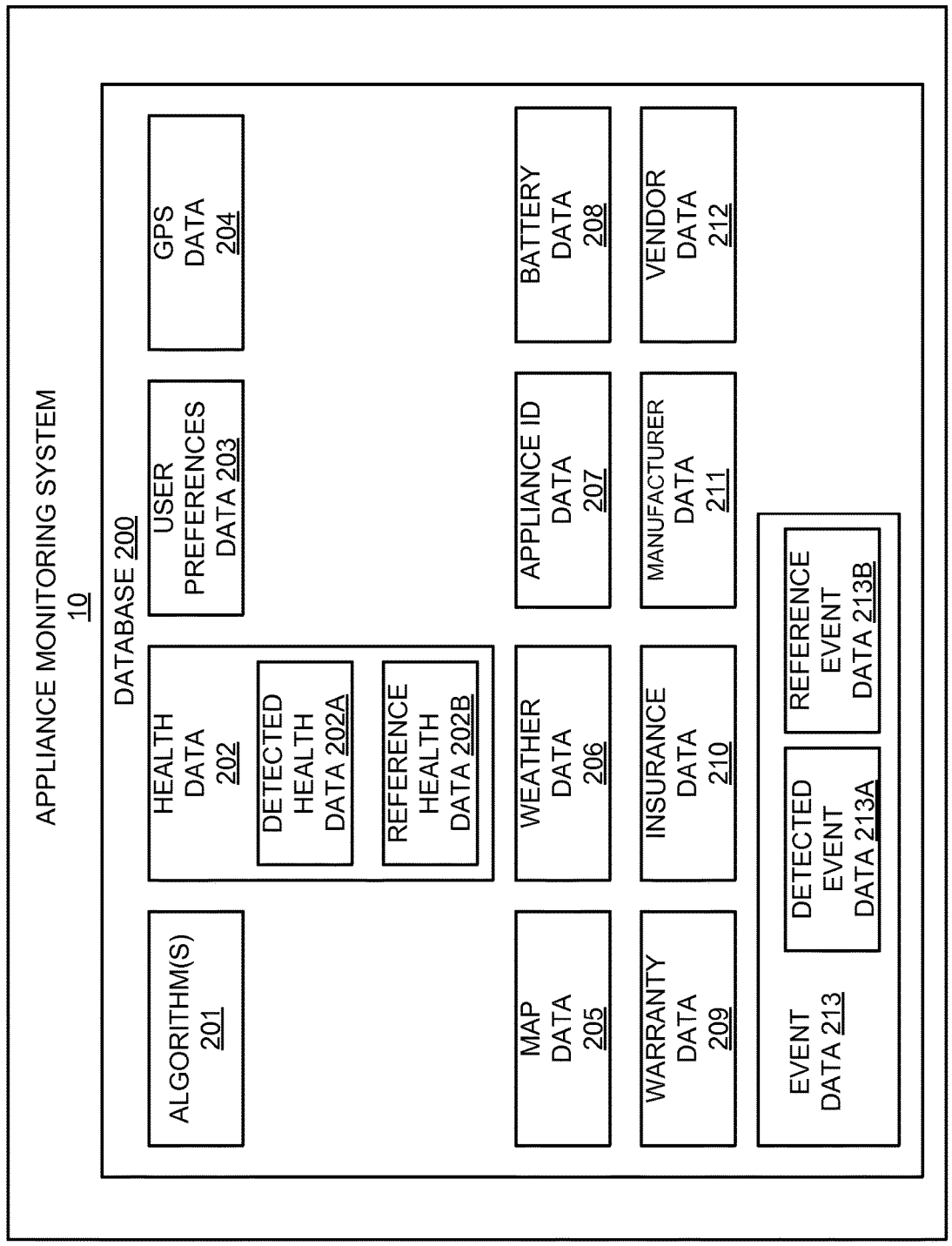
FIG. 4 is a block diagram of an example of a database that can be employed in the appliance monitoring system of FIG. 2.

The program code 102 for determining that the appliance 11 exhibits a maintenance issue may be designed with logic that, among other things, compares the health data that is detected/received from the appliance 11 with stored health data (reference), and then determines that the maintenance issue exists based upon the comparison. As shown in FIG. 4, the detected health data 202A and reference health data 202B are stored in a database 200. In some implementations, the reference health data 202B is obtained from a remote computer system 18 or PCD 19. One or more algorithms 201 FIG. 4 can be implemented for assisting in the determination, and they can be simple or complex. As an example of a simple algorithm 201, the reference health data 202B could be lifespan expectancy data for the appliance 11 and the detected health data received from the appliance 11 could be indicative of a length of time in which the appliance 11 has been in service or in use, or when it was manufactured. The algorithm 201 could be implemented to compare the received health data with the lifespan expectancy data, and when the received health data exceeds the lifespan expectancy, then the algorithm 201 would signal a maintenance issue.

Another example of an algorithm 201, which is more complex, performs the foregoing steps but performs the additional step of averaging lifespan expectancy data pertaining to several appliance brands in order to produce a resultant reference health data for the aforementioned comparisons. The appliance monitoring system 10 may be further designed with program code for engaging in a communication session over the Internet with one or more remote computer systems 18 (FIG. 1) for obtaining the brand data or reference data.

Yet another example, of an algorithm 201 involves using local weather data 206 measured with a local transducer (sensor) situated at or near the site 14 for affecting the maintenance issue determination. The weather data 206 may be indicative of temperature, humidity, pressure, averages of the foregoing measurements over a time period, etc. More specifically, the algorithm 201 may be designed to adjust the reference health data 202B to compensate for harsh conditions. For instance, if the reference health data 202B is a lifespan expectancy, then the algorithm 201 may be designed to perform the comparison(s) mentioned previously but, in addition, lower the reference health data 202B by twenty five percent (25%) when the average temperature has been over ninety (90) degrees Fahrenheit for the last 8 months.

The appliance monitoring system 10 may be further designed with program code for initiating a notification communication session with a PCD 19 (FIG. 1) and for communicating a report during the notification communication session indicative of the maintenance issue. The PCD 19 can be associated with any of the following (all of which are denoted by reference numeral 17 in FIG. 1 for simplicity): an appliance manufacturer, an appliance vendor, a repair service entity, an appliance replacement service, an appliance information provider, etc.

The appliance monitoring system 10 can be designed with program code to engage in a communication session over the Internet with a remote computer system 18 (FIG. 1) associated with an appliance manufacturer, an appliance vendor, a repair service entity, a replacement service entity, or an appliance information provider, and during the communication session, to request service, replacement, information, etc., in connection with the appliance 11.

The appliance monitoring system 10 can be designed with program code to store, maintain, update, and monitor the health data 202 (FIG. 4) for a plurality of different appliances 11. In this case, the system 10 can store different types of maintenance information pertaining to the different types of appliances 11. For example, the health data that is monitored in connection with a light bulb might be its life (which is compared with its expected lifespan or a percentage thereof to determine if a maintenance issue exists), whereas the health data that is monitored in connection with an appliance battery might be a power level when current is sourced from the battery (which is compared with a minimum threshold to determine if a maintenance issue exists).

The appliance monitoring system 10 can be designed with program code to turn off an appliance 11 with electronic functionality or disable one or more electrical functions associated with an appliance 11 based upon health data 202. This may be desirable, for example, in cases where the appliance 11 may be a hazard if not turned off or disabled in some manner.

The appliance monitoring system 10 can be designed with program code to provide a user interface to enable a party to input maintenance information (stored in user preferences database 203 of FIG. 4) pertaining to the appliance 11. This maintenance information can be used, at least in part, in determining when the appliance 11 exhibits a maintenance issue.

2. Second Set of Embodiments

A second set of embodiments of the appliance monitoring system 10 (FIGS. 1 and 2), denoted by reference numeral 110, will now be described with reference to FIG. 3B. In this second set, the appliance monitoring system 10 includes at least the following program code (or logic): program code 111 for monitoring health data concerning an appliance 11; program code 112 for comparing the health data with stored health data; program code 113 for determining that the appliance 11 exhibits a maintenance issue based upon the comparison; and program code 114 for requesting service in connection with the appliance 11.

3. Third Set of Embodiments

A third set of embodiments of the appliance monitoring system 10 (FIGS. 1 and 2) will now be described with reference to FIG. 3C and is denoted by reference numeral 120. In this third set, the appliance monitoring system 10 includes at least the following program code (or logic): program code 121 for identifying a plurality of appliances 11 that are connected to a network 16, such as a wireless network 16; program code 122 for storing an identity 207 for each of the appliances 11; program code 123 for receiving health data concerning an appliance 11 of the plurality; and program code 124 for determining that the appliance 11 exhibits a maintenance issue based upon the health data.

In some embodiments, the appliance monitoring system 10 may be designed with program code to pull appliance identities by broadcasting a registration request to the appliances 11 via the network, receiving a response communication from one or more of the appliances, and determining, or detecting, the identity of the one or more appliances 11 based upon the response. The program code may further be designed to assign an ID to an appliance 11 that is different than the ID information pulled from the appliance 11.

The appliance monitoring system 10 can be designed with program code to receive a registration request that has been pushed to it from one or more of the appliances 11, and to determine the identity of the one or more appliances 11 based upon the registration request. Again, the program code may further be designed to assign an ID to an appliance 11 that is different than the ID information pulled from the appliance 11. A nonlimiting example of such registration scheme that can be employed is described in U.S. Pat. No. 7,372,004, which is incorporated herein by reference.

U.S. patent application no. 2003/0149757, which is incorporated herein by reference, describes an identification (ID) code management system for a home network that can be implemented by various embodiments of the present disclosure in order to manage various appliances 11. The ID codes can be assigned during the appliance registration process.

Once the appliance IDs are assigned and/or identified, the appliance monitoring system 10 has program code for storing the appliance ID data 207 (FIG. 4) in a database 200 in memory 32 (FIG. 2). This ID data 207 is used to manage and track information associated with the appliance(s) 11.

In some embodiments, the appliance monitoring system 10 can have program code to engage in a communication session over the Internet 20 with a remote computer system 18, to receive appliance information from the computer system 18, and to determine that the appliance exhibits the maintenance issue based at least in part on the information. The information may include the expected life of the appliance or parts thereof, etc.

In some embodiments, after appliances 11 have been identified, the appliance monitoring system 10 can have program code to engage in an initial communication session over the Internet 20 with a remote computer system 18, and to provide registration information (e.g., serial number, information input by a user via a suitable interface on an appliance 11, etc.) to the computer system 18 during the initial communication session. The registration information could be for the purpose of applying for or perfecting a warranty or insurance policy on the appliance, registering for future assistance with analyzing health data, etc. The computer system 18 can also use point of sale (POS) information, for example but not limited to, scanned bar code information from the appliance 11, a purchaser name, credit or debit card information, store member card information, etc., in combination with information received from an appliance 11 in order to apply for or perfect a warranty or insurance policy. The communication session to apply or perfect can be initiated at the request of the host computer system 12 or the remote computer system 18.

The program code may be further designed to receive and store warranty or insurance confirmation information (warranty data 209 or insurance data 210 in FIG. 4) from the computer system 18 after the registration information is provided. The communication session can be initiated at the request of the host computer system 12 or the remote computer system 18.

The appliance monitoring system 10 may be further designed with program code to engage in a communication session over the Internet 20 with a remote computer system 18 associated with a manufacturer or vendor (manufacturer data 211 or vendor data 212 in FIG. 4) in order to make a claim against an insurance policy or warranty based upon the maintenance issue. The computer system 18 can also use POS information, for example but not limited to, scanned bar code information from the appliance 11, a purchaser name, credit or debit card information, store member card information, etc., in combination with information received from an appliance 11 in order to make the claim in connection with the warranty or insurance policy.

4. Fourth Set of Embodiments

A fourth set of embodiments of the appliance monitoring system 10 (FIGS. 1 and 2) will now be described with reference to FIG. 3D and is denoted by reference numeral 130. In this third set, the appliance monitoring system 10 includes at least the following program code (or logic): program code 131 for engaging in a communication session with an appliance 11; program code 132 for monitoring battery information concerning an appliance 11; and program code 133 for determining that the appliance 11 exhibits a problematic battery condition based upon the battery information.

The appliance monitoring system 10 can be designed with program code that identifies one or more, but oftentimes a plurality, of appliances 11 that are connected to the network 16, such as a wireless network 16 at the site 14, that stores an identity for each of the appliances 11 in a database 200 (appliance ID data 207 in FIG. 4), and that stores the battery information in the database 200 (battery data 208 in FIG. 4) in relation to the identity corresponding to the appliance 11.

The appliance monitoring system 10 may be designed with program code that pulls the appliance identity information from the appliances 11 by broadcasting a registration request to the appliances 11 via the network 16, receiving a response communication from one or more of the appliances 11, and determining the identity of the one or more appliances 11 based upon the response.

The appliance monitoring system 10 may also be designed with program code to receive a registration request from one or more of the appliances 11 that are pushed to it from the appliances 11. The program code determines the identity of the one or more appliances 11 based upon the registration request.

Once the appliances are identified, the appliance monitoring system 10 stores an identity for each of the appliances 11 in the database 200 (appliance ID data 207 in FIG. 4).

In some embodiments, the appliance monitoring system 10 can have program code to engage in a communication session over the Internet 20 with a remote computer system 18, to receive battery information from the computer system 18, and to determine that the appliance 11 exhibits the problematic battery condition based at least in part on the information. The information may include the expected life of the battery, acceptable voltage level when a certain amount of current is sourced to a load, etc.

In some embodiments, after appliances 11 have been identified, the appliance monitoring system 10 can have program code to engage in an initial communication session over the Internet 20 with a remote computer system 18, and to provide registration information to the computer system 18 during the initial communication session. The registration information could be for the purpose of applying for or perfecting a warranty or insurance policy on the battery, registering for future assistance with analyzing battery data, etc. The program code may be further designed to receive and store warranty or insurance confirmation information from the computer system 18 after the registration information is provided. Further note that the communication session can be initiated at the request of the host computer system 12 or the computer system 18.

The appliance monitoring system 10 may be further designed with program code to engage in a communication session over the Internet 20 with a remote computer system 18 in order to make a claim against an insurance policy or warranty based upon the problematic battery condition.

C. Appliance Monitoring System Database

An example of a database 200 that can be maintained and updated by the appliance monitoring system 10 in the memory 32 (FIG. 2) is illustrated in FIG. 4. Although not limited to this configuration, the database 200 is preferably a relational database. As shown, this example database 200 can include, as applicable, depending upon the embodiment to be practiced: one or more algorithms 201 that are used for analyzing health data, battery data, and/or other data; health data 202 (which includes detected health data 202A and reference health data 202B); user preferences data 203; GPS data 204; map data 205; weather data 206, appliance ID data 207, battery data 208, warranty data 209, insurance data 210, manufacturer data 211, vendor data 212, event data 213 (which includes detected event data 213A and reference event data 213B), etc.

D. Insurance Business Method

A method of doing business in connection with insurance is also provided by this disclosure. The method can be practiced by an insurance seller in connection with appliances 11 that are monitored by the appliance monitoring system 10. The steps of the method can be performed by a person or can be performed, in whole or in part, by remote computer system 18 (FIG. 1) associated with an insurance seller. When implemented with a computer system 18, the steps can be performed by corresponding program code (logic).

Figure 5:
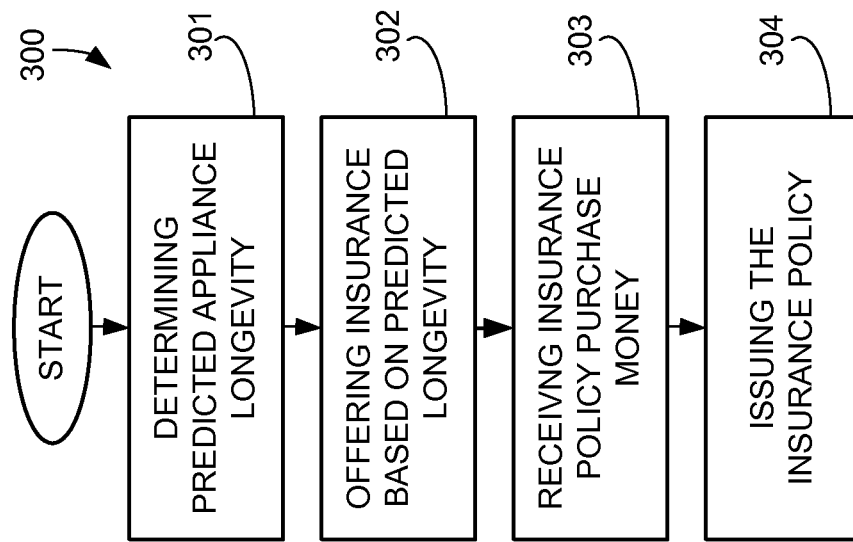
FIG. 5 is a flow chart of an insurance business method that can be employed in connection with the appliance monitoring system of FIGS. 1 and 2.

As shown in FIG. 5, the insurance business method 300 comprises the steps of: at step 301, determining a predicted longevity of an appliance 11, which could optionally be based at least in part upon monitored health data; at step 302, offering for sale insurance based upon the predicted longevity; at step 303 receiving money as payment for the insurance from a payee; and at step 304, issuing an insurance policy to the payee. As an example, the predicted longevity can be an average life expectancy of the appliance 11.

The method may further comprise the steps of receiving an insurance claim based upon a failure of the appliance 11 and determining whether payment on the claim should occur based upon the predicted longevity and a time associated with the failure.

The method may further comprise the steps of determining a plurality of predicted longevities based upon the monitored health data; associating a different monetary purchase amount for insurance for each of the plurality; and offering for sale a plurality of insurance options for the electronic appliance, each having a respective monetary purchase amount.

The method may further comprise considering geographical location of purchase of the insurance or of a location of use of the appliance 11 when determining the longevity or purchase price of the insurance.

The method may further comprise considering the type of use of the appliance 11 when determining the longevity or purchase price of the insurance. The type could be residential, commercial, hazardous use or area, etc.

E. Determination of Appliance Maintenance Issue Based Upon Detected Event

Figure 6:
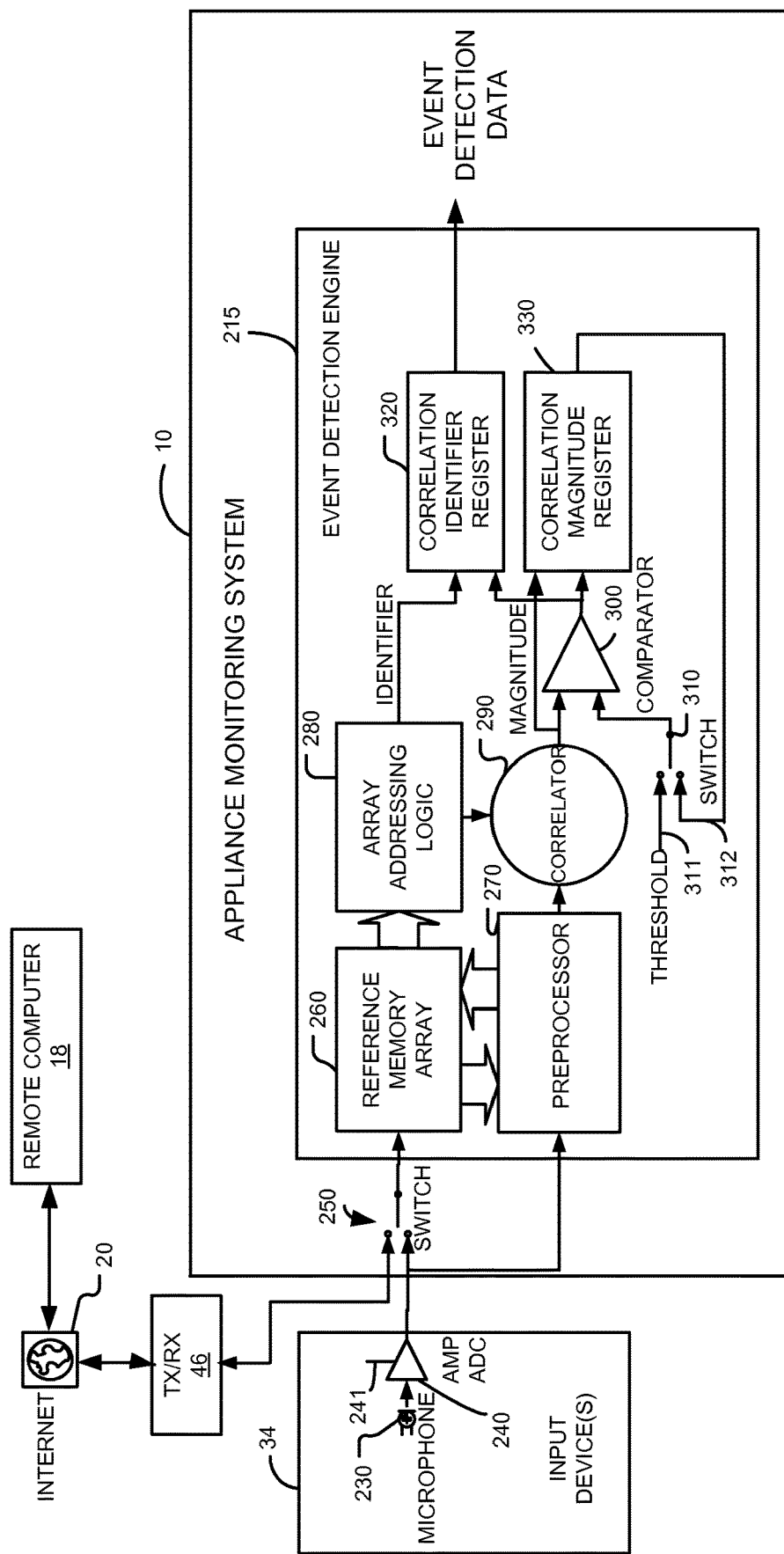
FIG. 6 is a block diagram of an example of an event detection engine that can be employed in the appliance monitoring system of FIG. 2 for identifying events (changes in environmental conditions) at the site of FIG. 1.
Figure 7:
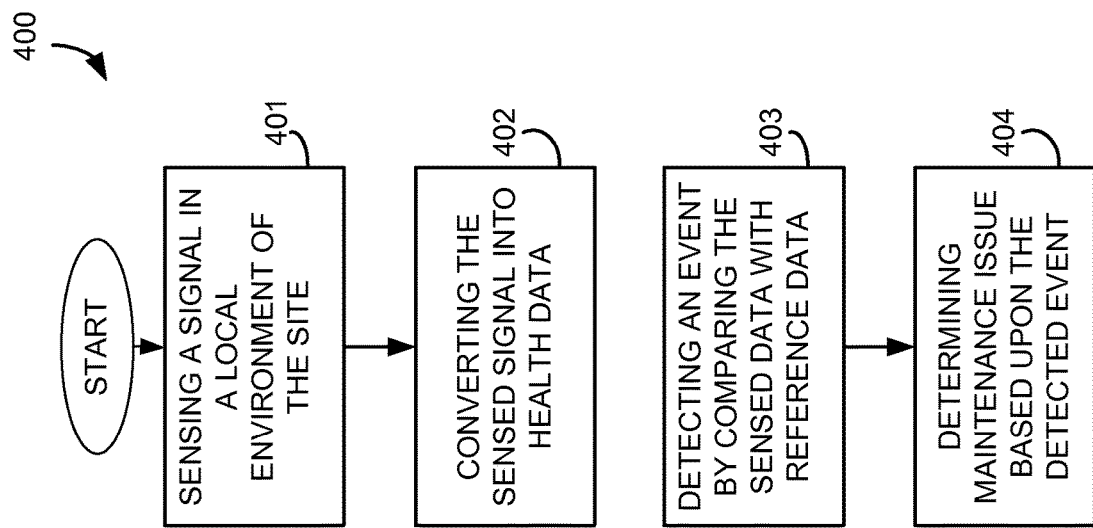
FIG. 7 is a flow chart of an embodiment of the appliance monitoring system of FIG. 2 that utilizes the event detection engine of FIG. 6.

The appliance monitoring system 10 can be designed to determine that a maintenance issue exists with respect to an appliance 11 based upon an event that is detected in the local environment of the site 14 with an event detection engine 215, an example of which is illustrated in FIG. 6. In these possible embodiments, as shown in FIG. 7, the appliance monitoring system 10 (FIGS. 1 and 2) implements logic 400 in connection with the event detection engine 215. More specifically, the appliance monitoring system 10 has logic 401 designed to sense a signal in a local environment associated with the site 4 using one or more transducers 34 (FIG. 2); logic 402 designed to convert the sensed signal to detected health data 201A (FIG. 4); logic 403 designed to detect that an event has occurred with the event detection engine 215 (FIG. 6) by comparing the sensed data 202A with reference health data 202B that corresponds to the event; and logic 404 designed to determine whether or not a maintenance issue exists in connection with an appliance 11 based upon the detected event.

As an example, the detected event could be a mechanical problem associated with a dishwasher. In this scenario, the transducer 34 could be a microphone, as shown in FIG. 6, for monitoring the sound associated with the dishwasher. When the sound changes substantially from the norm, the event detection engine 215 can detect this occurrence and cause logic 404 to determine that a maintenance issue exists in connection with the dishwasher. The sound change can be detected by comparing current detected sound data with reference sound data that corresponds with normal operation, and when they do not match, within predefined limits, abnormal operation can be concluded.

In some embodiments, the appliance monitoring system 10 may be designed with logic for storing identification information relating to a plurality of events and with logic for enabling the user to select which of the events will be detected.

FIG. 6 shows the one or more input devices 34, such as but not limited to, an audio microphone, etc., for receiving one or more event signatures (could be detected event data 213A or reference event data 213B of FIG. 4, depending upon the mode of operation) that are used to identify environmental events. The input devices 34 can include any transducer for sensing acoustic, thermal, optical, electromagnetic, chemical, dynamic, wireless, or atmospheric conditions, for example but not limited to, an audio microphone, video camera, Hall Effect magnetic field detector, flux gate compass, electromagnetic field detector, barometric pressure sensor, thermometer, ionization detector, smoke detector, gaseous detector, radiation detector, etc. The detection engine 215 may also receive reference event signatures from a remote computer 18 via the Internet 20.

The detection engine 215 stores the one or more reference signatures in memory 110 (reference event data 213B of FIG. 4) that are used to identify environmental events, that correlates sensed environmental signals with the reference signatures, and that detects occurrences of the environmental events. A nonlimiting example of such a detection engine 215 is described in U.S. Pat. No. 7,872,574, which is incorporated herein by reference in its entirety. The discussion hereafter will describe incorporation of the latter detection engine 215 in the architecture of the present invention.

The event detection engine 215 is designed to be operated in several modes. The architecture of the event detection engine 215 will be described as each of these modes is described in detail hereafter.

1. First Mode

In a first mode, the remote computer 18 is connected to a reference memory array 260 by a switch 250. One or more reference signatures can be collected by the remote computer 18 and loaded into the reference memory array 260.

In this example, when an audio event is being detected, the event detection engine 215 is designed to transform audio recordings into suitable numerical arrays to create the reference signatures for recognition. The frequency range of 0.2 Hz to 20 KHz is sufficient for many applications. Furthermore, a time interval of several seconds is normally sufficient.

The preprocessor 270 extracts the reference signals from the reference memory array 260 and reformats them to facilitate rapid correlation. The frequency domain is a preferred format for sonograms. The preprocessor 270 analyzes each signature by a sequence of Fourier transforms taken repeatedly over a period of time corresponding to the duration of the signature. The Fourier transform is preferably a two-dimensional vector, but a single measure of amplitude versus frequency is sufficient. In the preferred embodiment, among many possible embodiments, the event detection engine 215 processes a 3-dimensional array of amplitude, frequency, and time. The transformed signature arrays are stored back into a reference memory array 260 for subsequent rapid correlation. Preferably, each reference signature array includes an identifier field associated with the signature. As an example, this may be the name and picture/image of an appliance 11 associated with the signature.

2. Second Mode

In a second mode of operation, event detection engine 215 can acquire the reference signature signal directly from the local environment via an input device 34, for example, the audio microphone 34, as shown in FIG. 6. Audio signals from the microphone 34 are amplified and converted to digital signals by amplifier and analog-to-digital converter (ADC) 240. The digital signal from amplifier and ADC 240 is selected by the user via the switch 250 and loaded directly into the reference memory array 260. Preferably, several seconds of signal are collected in this particular application. Then, the preprocessor 270 reformats the reference signal for rapid correlation, preferably by Fourier transform.

A gain control 241 associated with the ADC 240 can be controlled by the user to control the range of the microphone 34 (or another input device, if applicable, and depending upon the application).

3. Third Mode

In a third mode of operation, the event detection engine 215 monitors the environment continuously (at discrete successive short time intervals due to the computer-based architecture) for signals that match those stored in the reference memory array 260. To reduce computational burden, the preprocessor 270 is designed to monitor the microphone 230 for a preset threshold level of signal before beginning the correlation process. When the signal exceeds the preset threshold level, the preprocessor 270 begins executing a Fourier transform. After several seconds or a period equal to the period of the reference signatures, the transformed active signal is stored at the output of the preprocessor 270. Then, array addressing logic 280 begins selecting one reference signature at a time for correlation. Each reference signature is correlated by a correlator 290 with the active signal to determine if the reference signature matches the active signal from the environment.

The comparator 300 compares the magnitude of the output of the correlator 290 with a threshold to determine a match. When searching for events in the active signal, such as emergency signals, the correlator 290 is compared with a fixed threshold. In this case, the switch 310 selects a fixed threshold 311 for comparison. If the correlation magnitude exceeds the fixed threshold 311, then the comparator 300 has detected a match. The comparator 300 then activates the correlation identifier register 320 and the correlation magnitude register 330. The magnitude of the comparison result is stored in the correlation magnitude register 330, and the identity of the source is stored in the correlation identifier register 320. The fixed threshold 311 can be predefined by a programmer or the user.

After event detection by the event detection engine 215, the process is stopped and the array addressing logic 280 is reset. A search for new active signals then resumes.

4. Fourth Mode

In a fourth mode of operation, the event detection engine 215 searches for the best match for the sensed signal. In this case, the correlation magnitude register 330 is first cleared. Then, the switch 310 selects the output 312 of the correlation magnitude register 330 as the threshold input to the comparator 300. The array addressing logic 280 then sequentially selects all stored references of a set for correlation. After each reference in the set is correlated, the comparator 300 compares the result with previous correlations stored in the correlation magnitude register 330. If the new correlation magnitude is higher, then the new correlation magnitude is loaded into the correlation magnitude register 330, and the respective identifier is loaded into the correlation identifier register 320.

In an alternative embodiment, the correlation process can be performed by an associative process, where the active reference is associated directly with the stored references in a parallel operation that is faster than the sequential operation. New device technologies may enable associative processing. For example, reference memory array 260 can utilize content addressable memory devices for associative processing. ASIC devices and devices, such as the Texas Instruments TNETX3151 Ethernet switch incorporate content addressable memory. U.S. Pat. No. 5,216,541, entitled "Optical Associative Identifier with Joint Transform Correlator," which is incorporated herein by reference, describes optical associative correlation.

This correlation process continues until all stored reference signatures in the set under analysis have been correlated. When the correlation process is completed, the correlation identifier register 320 holds the best match of the identity of the source of the active signal. The appliance monitoring system 10 reads the event detection data 321 from this register 320 and then determines whether or not a maintenance issue exists. In addition, the identity of the event can also be displayed as a photo or text description in a display 34, if desired. If the final correlation magnitude is lower than a predetermined threshold, then the active signature can be loaded into the reference memory array 260 as a new unknown source.

F. Other Variations and/or Modifications

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure.

With respect to variations, note that although not specifically described for simplicity, any combination of the various systems/methods that have been described under headings above may be employed in connection with battery remediation.

As another example of a variation, note that the comparing process that is performed by the detection engine 215 in order to detect an environmental event associated with an appliance 11 can be performed in the time domain as opposed to the frequency domain, and in some cases, this may be the preferred methodology.

As yet another example of a variation, many of the embodiments of the present disclosure can be practiced in the architecture described in U.S. Pat. No. 6,496,575, which is incorporated herein by reference. The foregoing patent describes a server platform server that communicates with various appliances as well as various remote computers. This server platform server with associated software could be employed as the host computer system 12 (FIG. 1) of the present disclosure.

As yet another example of a variation, many of the embodiments of the present disclosure can be practiced in the architecture described in U.S. Pat. No. 6,853,291, which is incorporated herein by reference. The foregoing patent describes a device F with a microcontroller that is designed to capture statistical and diagnostic information regarding various appliances. This device F with support circuitry and/or software can be utilized as the host computer system 12 (FIG. 1) of the present disclosure.

As yet another example of a variation, many of the embodiments of the present disclosure can be practiced in the architecture described in U.S. Pat. No. 7,336,192, which is incorporated herein by reference. The foregoing patent describes a monitoring device that communicates with appliances through the power lines that and also tracks work cycles of appliances, so that wear status of an appliance can be estimated. The communication method can be employed in connection with many embodiments of the present disclosure.

As yet another example of a variation, the host computer system 12 can be implemented remotely of the site 14 by utilizing the Open Service Gateway Initiative (OSGI) specification. The OSGI provides technology to allow management of localized electronics equipment (such as appliances) by use of an external service server. The server, located on a wide area network, such as the Internet, provides management services for the localized electronics equipment through a gateway into the home or workplace where the equipment is located.

As yet another example of a variation, the host computer system 12 can be implemented entirely within an appliance 11 so that it is communicatively coupled to the circuitry associated with the appliance 11 without the need for connectivity via the network(s) 16.

As yet another example of a variation, the host computer system 12 can be implemented as part of a computer based smartphone. In this embodiment, the smartphone can be interfaced wirelessly with one or more appliances 11 via, for example, near field communication (NFC) and/or IEEE 802.11 (WiFI) interfaces, in terms of software and hardware. In such embodiment, the one or more appliances 11 would be equipped with a computer system architecture with an appropriate NFC and/or IEEE 802.11 transceiver(s) and software drivers, as would the smartphone, in order to enable communications of data. Moreover, the smartphone can be equipped with software, such as a downloadable application, that can monitor use, longevity, or other data associated with appliances 11. This information can be used to alert a user when the user needs to buy a new appliance or appliance part. Any of the systems and methods described in this disclosure in connection with the host computer system 12 can be implemented in the smartphone.

As yet another example of a variation, the host computer system 12 can be implemented remotely from the site 14, or as part of, or in close association with the remote computer system 18 so that the functionality of the host computer system 12 and the functionality of the remote computer system 18 are communicatively coupled without the need for connectivity via the network(s) 16.

As yet another example of a variation, the host computer system 12 can be implemented as part of a WAP or router. The host computer system 12 can be designed to communicate with computer based appliances 11 via, for example, an IEEE 802.11 interface. Moreover, the network interface can be secured or not secured.

In one embodiment of a secured environment, the host computer system 12 can be designed to broadcast its username and password to the appliances 11 during a limited initialization period, and then stop broadcasting the password, in order to secure the network.

In another embodiment of a secured environment, the host computer system 12 can be designed with a user interface (e.g., a display, etc.) that outputs the devices that are attempting to log into the network. The user can then select which devices to allow so that the user can selectively elect to receive communications from only the appliances 11.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method implemented in a host computer system associated with a site having one or more appliances that communicate with the host computer system via one or more networks, comprising:
monitoring health data concerning an appliance or an appliance part;
determining that the appliance or appliance part exhibits a maintenance issue based upon the health data;
determining that the maintenance issue is associated with an electrical function;
turning off or disabling the appliance or the electrical function associated with the maintenance issue by operation of the host computer:
accessing a remote computer system over an Internet;
receiving one or more suggestions on where to order, purchase, or seek repair for the appliance or appliance part from the remote computer system;
producing a notification regarding the maintenance issue, the notification including the one or more suggestions and price information pertaining to each of the suggestions.

2. The method of claim 1, further comprising:
enabling a user to select and purchase the one or more suggestions, based at least in part upon the price.

3. The method of claim 1, wherein the notification is a message sent to a personal communication device or a remote computer system and wherein the message includes an identification of the appliance and detail concerning the maintenance issue.

4. The method of claim 1, wherein the health data is diagnostic information or electrical information relating to one of power, voltage, current, and/or impedance of or at appliance circuit elements.

5. The method of claim 1, further comprising the steps of:
initiating a notification communication session with a personal communication device (PCD); and communicating a report during the notification communication session indicative of the maintenance issue.

6. The method of claim 5, wherein the PCD is associated with any of the following: a vendor, a repair service entity, a replacement service entity, manufacturer, or an information provider.

7. The method of claim 1, further comprising the steps of:
maintaining a database having maintenance information pertaining to a plurality of appliances;
storing in the database a first type of maintenance information pertaining to a first type of appliance; and
storing in the database a second type of maintenance information pertaining to a second type of appliance, the second type being different than the first type.

8. The method of claim 1, further comprising the step of providing a user interface to enable a party to input maintenance information pertaining to the appliance, the maintenance information used, at least in part, in determining when the appliance exhibits the maintenance issue.

9. The method of claim 1, further comprising the steps of:
engaging in a communication session over the Internet with a computer system associated with a repair or replacement service business; and
during the communication session, requesting service in connection with the appliance.

10. A computer system communicatively coupled with one or more appliances at a site via one or more networks, comprising:
one or more memories that store a computer program code; and
one or more processors that execute the computer program code, the computer program code comprising:
code that determines that an appliance or appliance part exhibits a maintenance issue comprising:
code that causes an appliance to be turned off or that disables one or more functions associated with the appliance, after determining that the maintenance issue exists;
code that accesses reference data, the reference data comprising a first numerical array, the first numerical array comprising a first collection of related successive signal sample values that represent a time varying environmental signal;
code that receives appliance condition data, the appliance condition data comprising a second numerical array, the second numerical array comprising a second collection of related successive signal sample values derived from a time varying environmental signal sensed by a transducer at the site;
code that compares the arrays associated with the appliance condition data and the reference data in a time domain, frequency domain, or both; and
code that initiates a notification regarding the maintenance issue, when determined.

11. The system of claim 10, wherein the computer program code further comprises code that produces one or more suggestions on where to order, purchase, or seek repair for the appliance or the appliance part.

12. The system of claim 10, wherein the computer program code further comprises:
code that provides price information pertaining to each of a plurality of suggestions; and
code that enables a user to select and purchase one of the plurality of suggestions.

13. The system of claim 10, wherein the code that correlates the numerical arrays is designed to compare a correlation output and a predefined threshold in order to determine when the appliance or appliance part exhibits the maintenance issue.

14. The system of claim 10, wherein the transducer is a microphone and the environmental signal is an audio signal produced by the appliance or appliance part.

15. The system of claim 10, wherein the code that determines that the appliance or appliance part exhibits the maintenance issue makes this determination based at least in part upon a lifespan expectancy and a length of time in which the appliance or the appliance part has been in service or in use.

16. The system of claim 10, wherein the code that initiates the notification comprises:
code that initiates a notification communication session with a personal communication device (PCD); and
code that causes communication of a report during the notification communication session indicative of the maintenance issue.

17. The system of claim 16, wherein the PCD is associated with any of the following: an owner or user of the appliance, a vendor, a repair service entity, a replacement service entity, manufacturer, or an information provider.

18. The system of claim 10, wherein the computer program code further comprises code that enables a party to input maintenance information pertaining to the appliance or appliance part, the maintenance information used, at least in part, in determining when the appliance or appliance part exhibits the maintenance issue.

19. A computer system communicatively coupled with one or more appliances at a site via one or more networks, comprising:
one or more memories that store a computer program code; and
one or more processors that execute the computer program code, the computer program code comprising:
code that determines that an appliance or appliance part exhibits a maintenance issue comprising:
code that causes an appliance to be turned off or that disables one or more functions associated with the appliance, after determining that the maintenance issue exists;
code that maintains a database having maintenance information pertaining to a plurality of appliances;
code that stores in the database first type of maintenance information pertaining to a first type of appliance; and
code that stores in the database a second type of maintenance information pertaining to a second type of appliance, the second type being different than the first type.

* * * * *